US008800618B2

United States Patent
Shimizu

(12) United States Patent
(10) Patent No.: US 8,800,618 B2
(45) Date of Patent: Aug. 12, 2014

(54) PNEUMATIC TIRE HAVING LUG GROOVES

(75) Inventor: Akiyoshi Shimizu, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1602 days.

(21) Appl. No.: 11/883,550

(22) PCT Filed: Jan. 11, 2006

(86) PCT No.: PCT/JP2006/000162
§ 371 (c)(1),
(2), (4) Date: Aug. 2, 2007

(87) PCT Pub. No.: WO2006/082696
PCT Pub. Date: Aug. 10, 2006

(65) Prior Publication Data
US 2008/0041509 A1    Feb. 21, 2008

(30) Foreign Application Priority Data
Feb. 3, 2005 (JP) ................. 2005-027757

(51) Int. Cl.
*B60C 11/13* (2006.01)
(52) U.S. Cl.
USPC ................. 152/209.21; 152/209.13
(58) Field of Classification Search
USPC ............. 152/209.13, 209.15, 209.21
See application file for complete search history.

(56) References Cited

U.S. PATENT DOCUMENTS

| 4,289,183 | A * | 9/1981 | Abe et al. ............... | 152/209.13 |
| 2007/0102085 | A1 * | 5/2007 | Ohashi ................. | 152/209.18 |

FOREIGN PATENT DOCUMENTS

| JP | 53-069304 | * | 6/1978 |
| JP | 61-60308 A | | 3/1986 |
| JP | 62-151101 U | * | 9/1987 |
| JP | 2-179507 A | | 7/1990 |
| JP | 05-000607 | * | 1/1993 |
| JP | 05-229312 | * | 9/1993 |
| JP | 5-229312 A | | 9/1993 |
| JP | 2918227 | * | 7/1999 |
| JP | 2000-264022 A | | 9/2000 |
| JP | 2001-39124 A | | 2/2001 |
| JP | 2002-067625 | * | 3/2002 |
| WO | WO 97/46400 A1 | | 12/1997 |
| WO | WO 2004/041556 A1 | | 5/2004 |

OTHER PUBLICATIONS machine translation for Japan 2002-067625 (no date).*
machine translation for Japan 05-229312 (no date).*
machine translation for Japan 2918227 (no date).*

(Continued)

*Primary Examiner* — Steven D Maki
(74) *Attorney, Agent, or Firm* — Sughrue Mion, PLLC

(57) ABSTRACT

A component Fin toward an axial inner direction of the tire which is an opposite direction from an axial outer direction of the tire is applied to a force acting on a kicking end 16B of a land portion 16. With this, abrasion of the kicking end of the land portion can be moderated, and a biased abrasion resistance can be enhanced. A groove wall 20 of a lug groove 14 is provided with a step portion 22, a tread side groove width WA in a tread side of the step portion is widened toward an axial outer side of the tire, and a width WS of the step portion 22 is increased toward the axial outer side of the tire, thereby suppressing the lift from the road surface 26 at the tread-in end 16A of the land portion 16.

5 Claims, 5 Drawing Sheets

(56) References Cited

OTHER PUBLICATIONS translation for Japan 53-069304 (no date).*
machine translation for Japan 05-000607 (no date).*
translation for Japan 62-151101 U (no date).*

* cited by examiner

PNEUMATIC TIRE HAVING LUG GROOVES

TECHNICAL FIELD

The present invention relates to a pneumatic tire for heavy load, and more particularly, to a pneumatic tire capable of enhancing the biased abrasion resistance of a tread.

BACKGROUND ART

In a pneumatic tire for heavy load which is used for a super construction vehicle and in which special emphasis is placed on running on an unpaved road, a lug pattern is employed as a tread pattern, a tread thickness with respect to a cross-sectional height of the tire is set great, thereby securing cut-resistance (see patent documents 1 and 2).

Patent Document 1: Japanese Patent Application Laid-open No. 2000-264022
Patent Document 2: Japanese Patent Application Laid-open No. 2001-39124

DISCLOSURE OF THE INVENTION

Problem to be Solved by the Invention

However, if the tread thickness is increased as in the above-described conventional technique, rigidity of a land portion divided by a lug groove is deteriorated, and there is a tendency that a portion (kicking end) of the land portion which lastly comes into contact with a road surface is largely worn (heel-and-toe abrasion) than a portion (tread-in end) of the land portion which first comes into contact with the road surface.

The biased abrasion not only deteriorates outward appearance, but also increases the volume of rubber to be worn and thus, the abrasion resistance is deteriorated.

To solve this problem, in the conventional technique, the lug groove at the most worn portion is made shallow, and the rigidity of the land portion is increased. In this case, although the deformation of the land portion is suppressed, since a force which becomes burden on the land portion is also increased, sufficient effect can not be obtained, and since the volume of the tread rubber is increased, the temperature of the tire during running is increased, and the durability is deteriorated.

In view of the above circumstances, in a pneumatic tire for heavy load, it is an object of the present invention to maintain its durability, and to enhance the biased abrasion resistance of the tread.

Means for Solving Problem

To devise this invention, the present inventor studied very hard from two view points, that is, a force acting in a widthwise direction of the tire and a force acting in a circumferential direction of the tire concerning abrasion of the tread and deformation of the land portion. As a result, the inventor found that the force acting in the widthwise direction of the tire is mainly caused by a slip in a direction orthogonal to a tire equatorial plane generated between the tread side of the tire and the road surface, and in an outward direction in the widthwise direction of the tire, and that in a pattern having the lug groove, there is a powerful tendency that a slip between the tread side of the tire and the road surface is generated in a direction orthogonal to a lug groove wall.

There is provided a pneumatic tire having lug grooves arranged in a tread in a direction intersecting with a circumferential direction of the tire and in the circumferential direction of the tire, and land portions divided by the lug grooves, in which when a distance from a ground-contact end to a tire equatorial plane in a state where the tire is assembled to a normal rim and a normal internal pressure is charged into the tire and a normal load is applied to the tire is defined as L, in a region where a distance from the tire equatorial plane to an axial outer side of the tire is in a range of from 0.45L to 0.55L, a step portion which is a boundary between a tread side groove wall and a tire center side groove wall is provided respectively on both sides of the lug groove, an average groove width at the tread side of the step portions is widened toward an axial outer side of the tire and the width of the step portion is increased toward the axial outer side of the tire, and the tread side groove walls are inclined in opposite directions from each other with respect to the axial direction of the tire at a tread-in end and a kicking end of the land portion.

In a pneumatic tire for a construction vehicle, a ground-contact pressure is concentrated because a belt width is narrow. For this reason, there is a tendency that in the region on the land portion of from 0.45L to 0.55L from the tire equatorial plane to the axial outer side of the tire (intermediate point between the tire equatorial plane and the ground-contact end, i.e., so-called ¼ point), the kicking end has a greater slip toward the axial outer side of the tire than that of the tread-in end, and the abrasion amount thereof is greater. However, the component toward an axial inner side of the tire which is opposite from the axial outer side of the tire is added to the force applied to the kicking end of the land portion and with this, the abrasion of the kicking end can be moderated, and it is possible to improve the phenomenon (biased abrasion and heel-and-toe abrasion in the circumferential direction of the tire) in which the difference in abrasion amount between the tread-in end and the kicking end is increased.

Further, the abrasion amount of the kicking end of the land portion is suppressed, the concentration of ground-contact pressure near the kicking end is improved and as a result, the abrasion amount at the axial outer side of the tire from the ¼ point is reduced and the biased abrasion in the tire width direction is also improved.

The groove wall of the lug groove is provided with the step portion, the tread side groove width at the tread side of the step portion is widened toward the axial outer side of the tire, and the width of the step portion is increased toward the axial outer side of the tire. Therefore, in a portion of the land portion where the ground-contact length near the ground-contact end is short, deformation of the land portion can be suppressed by the enhanced rigidity of the skirt of the land portion, deformation of the land portion can be absorbed by the step portion, and lift from the road surface at the tread-in end of the land portion can be suppressed. Even in a portion of the land portion where the ground-contact length near the tire equatorial plane is long, the volume of the lug groove can sufficiently be secured, (the volume of the tread rubber is not excessively increased), and heat radiation ability and drainage ability can be maintained.

Here, the "normal rim" means a standard rim having an appropriate size defined in the YEAR BOOK of 2004 issued by JATMA, and the "normal load" and the "normal internal pressure" are the maximum load and air pressure against the maximum load in an appropriate size and ply rating defined in the YEAR BOOK of 2004 issued by JATMA.

When TRA standard or ETRTO standard are applied in a using place or manufacturing place, the standards should be complied with accordingly.

A circumferential groove extending in the circumferential direction of the tire is formed in a region on the tread where a distance from the tire equatorial plane to the axial outer side of the tire is in a range of from 0.55L to 0.70L.

The present inventor conducted research concerning a relation between a slip between the tread side and the road surface and an angle formed between the groove wall of the lug groove and the axial direction of the tire. As a result, it was found that not only the ¼ point where the abrasion amount was great, but also the angle of the lug groove near the ground-contact end, greatly influence the generation of the biased abrasion, and that, depending upon the angle, the influence of deformation of the land portion near the ground-contact end is exerted to the vicinity of the ¼ point, and the biased abrasion suppressing effect is deteriorated.

The circumferential groove extending in the circumferential direction of the tire is formed in the region where a distance from the tire equatorial plane to the axial outer side of the tire is in a range of from 0.55L to 0.70L. Therefore, influence of the lug groove angle near the ground-contact end exerted on the biased abrasion suppressing effect can be eliminated, and the effect of the lug groove of claim 1 can be maximized.

The reason why the position where the circumferential groove is formed is set to the region of from 0.55L to 0.70L from the tire equatorial plane to the axial outer side of the tire is that if the distance is less than 0.55L, the rigidity near the circumferential groove is lowered and the biased abrasion resistance is deteriorated, and if the distance exceeds 0.70L, the effect of the circumferential groove is not easily transmitted to the ¼ point (the region between the circumferential groove and the tire equatorial plane is widened, and in the region, the influence of deformation of the land portion near the ground-contact end is exerted to the ¼ point), and the influence of the lug groove angle near the ground-contact end exerted on the biased abrasion suppressing effect can not be eliminated.

In consideration of cracks at the groove bottom or the like, it is preferable that the groove width of the circumferential groove is in a range of from 0.01L to 0.1L with respect to the distance L from the tire equatorial plane to the ground-contact end, and that the groove depth of the circumferential groove is in a range of from 20 to 60% of the groove depth of the lug groove.

A depth position where the step portion is formed is a position of from 0.3 to 0.7 times of a groove depth of the lug groove from the tread side to the tire center side.

Here, the reason why the depth position of the step portion is set to the range from 0.3 to 0.7 times of the groove depth of the lug groove from the tread side to the tire center side is that if the depth position exceeds 0.7 times, the step portion is excessively close to the bottom of the lug groove and the step portion is too far from the tread side and the biased abrasion suppressing effect is deteriorated, and if the depth position is less than 0.3 times, the step portion is too close to the tread side, the step portion disappears soon by abrasion of the tread and thus, the effect continuation time of the step portion becomes short.

The effect of the step portion can be exhibited most effectively by appropriately setting the distance from the tread side to the step portion.

An angle formed between the step portion and the tread side groove wall connected to the step portion is in a range of from 70° to 120°.

The reason why the angle formed between the step portion and the tread side groove wall connected to the step portion is in a range of from 70° to 120° is that if the angle is less than 70°, the durability with respect to the land portion wrench or the like is deteriorated, and if the angle exceeds 120°, the land portion deformation absorbing effect by the step portion is reduced.

Since the angle formed between the step portion and the tread side groove wall is appropriately set, the effect of the step portion can be exhibited most efficiently.

Effect of the Invention

As explained above, according to the pneumatic tire of the invention has excellent effect that in the pneumatic tire for heavy load, the biased abrasion resistance of the tread can be enhanced while the durability of the tire being maintained.

BEST MODE FOR CARRYING OUT THE INVENTION

Embodiments of the present invention will be explained based on the drawings.

First Embodiment

Figure 1A:
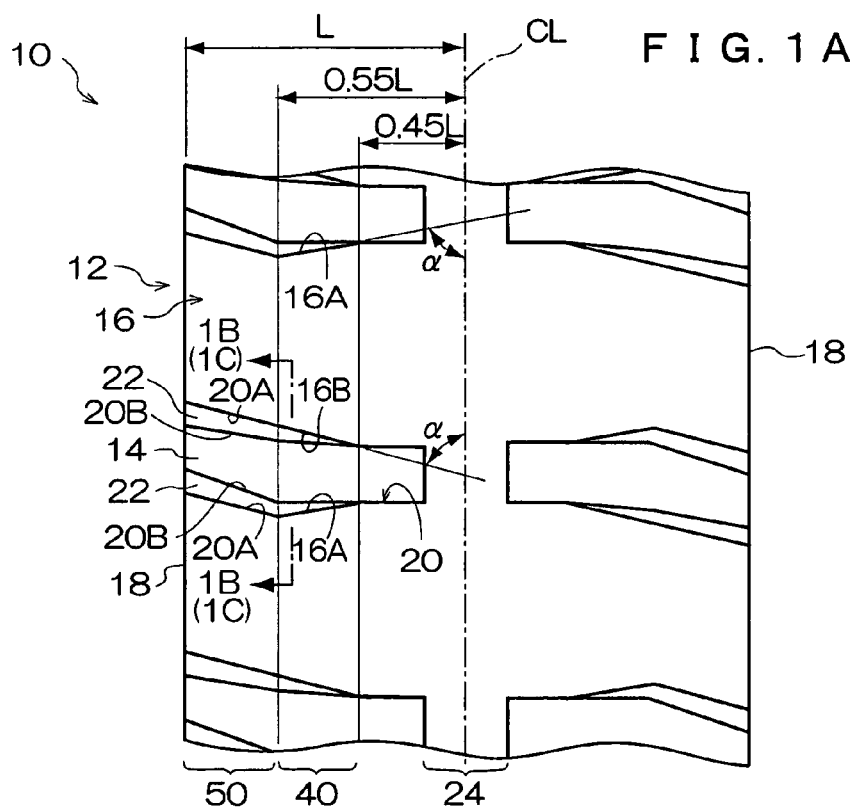
FIG. 1A is a diagram showing a tread pattern of a pneumatic tire according to a first embodiment.

In FIG. 1A, a pneumatic tire 10 of the present embodiment includes lug grooves 14 formed in a tread 12 arranged in a direction intersecting with a circumferential direction of the tire and in the circumferential direction of the tire, and land portions 16 divided by the lug grooves 14. A center rib 24 connected to the land portions 16 is provided at a tire equatorial plane CL. The lug grooves 14 terminate at the side of the tire equatorial plane CL without penetrating the center rib 24, and is formed up to at least a ground-contact end 18 at the axial outer side of the tire. Thin grooves for connecting the lug grooves 14 while interposing the tire equatorial plane CL therebetween may be arranged in the center rib 24.

Step portions 22 are provided on the pneumatic tire 10. The step portions 22 are boundaries between tread side groove walls 20A and tire center side groove walls 20B. The step portions 22 are provided on opposite groove walls 20 of the lug groove 14 in a region 40 where a distance from the tire equatorial plane CL toward the axial outer side of the tire is from 0.45L to 0.55L if a distance from the ground-contact end 18 to the tire equatorial plane CL is defined as L when the tire is assembled to a normal rim and a normal internal pressure is charged into the tire and a normal load is applied.

The reason why the range of the region 40 is set such that the distance from the tire equatorial plane CL toward the axial outer side of the tire is from 0.45L to 0.55L is that a biased abrasion resistance in the vicinity of an intermediate point between the tire equatorial plane CL and the ground-contact end 18, i.e., in the vicinity of a so-called ¼ point is caused to be enhanced.

Positions of from 0.45L and 0.55L from the tire equatorial plane CL in FIG. 1A are exaggerated for purposes of illustration, and the positions 0.45L and 0.55L from the tire equatorial plane CL are much closer as can be found from its size ratio.

Figure 1B:
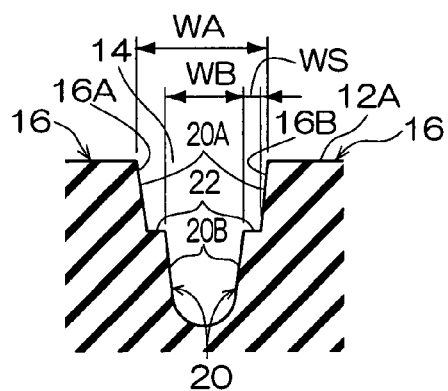
FIG. 1B is a cross-sectional view taken along the line 1B-1B in FIG. 1A.
Figure 1C:
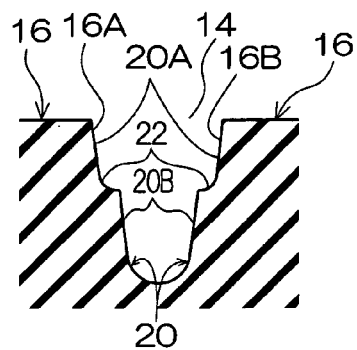
FIG. 1C is a cross-sectional view taken along the line 1C-1C in FIG. 1A, and shows a case in which a corner has a curvature between a step portion and a tread side groove wall.

As shown in FIG. 1B, a cross-sectional shape of the step portion 22 is step-shaped, but the cross section may have such a shape that corners between the step portion 22 and the tread side groove wall 20A have a curvature as shown in FIG. 1C. This is because that if the step portion 22 has the curvature, a crack is not easily generated in the corners.

As shown in FIGS. 1B and 1C, both the tread side groove wall 20A and the tire center side groove wall 20B of the lug groove 14 are formed such that their groove widths are increased from the groove bottom toward the tread side 12A.

As shown in FIG. 1A, in the lug groove 14 in the region 40, the average groove width WA in the tread side groove wall 20A of the step portion 22 is widened toward the axial outer side of the tire, and the width WS of the step portion 22 is increased toward the axial outer side.

In the region 40, the tread side groove walls 20A at a tread-in end 16A and at a kicking end 16B of the land portion 16 are respectively inclined in opposite directions at angles α with respect to the tire axial direction.

Here, the tread-in end 16A is a tread side edge in tread side groove wall 20A at the tread-side, and the kicking end 16B is a tread side edge in the tread side groove wall 20A at the kicking side.

The average groove width WB at the tire center side of the step portion 22 is not changed almost at all in the region 40, but since the average groove width WA is widened toward the axial outer side of the tire, a difference between the average groove width WA and the average groove width WB is increased and the width WS of the step portion 22 is increased with an amount of the difference correspondingly.

In a region 50 from the position of 0.55L in the axial direction of the tire from the tire equatorial plane CL which is the boundary of the region 40 to the ground-contact end 18, the average groove width WB of the lug groove 14 is slightly narrowed toward the axial outer side of the tire, the average groove width WA is substantially constant, and the width WS of the step portion 22 is slightly increased.

The shape of the lug groove 14 in the region 50 is not limited to this.

A depth position where the step portion 22 is formed is a position of from 0.3 to 0.7 times of a groove depth of the lug groove 14 from the tread side 12A to the tire center side.

Here, the reason why the depth position of the step portion 22 is set in this range is that if the depth position exceeds 0.7 times, the step portion 22 is excessively close to the bottom of the lug groove 14 and the step portion 22 is too far from the tread side 12A and the biased abrasion suppressing effect is deteriorated, and if the depth position is less than 0.3 times, the step portion 22 is too close to the tread side 12A, the step portion 22 will disappear soon by abrasion of the tread 12 and thus, the effect continuation time of the step portion 22 becomes short.

In FIG. 1B, the step portion 22 is illustrated in a direction which is tangent to the circumferential direction of the tire, but if the step portion 22 is inclined in a direction different from this direction, a boundary between the tread side groove wall 20A and the step portion 22 is set to be the depth position of the step portion 22.

As shown in FIG. 1C, when the corner between the step portion 22 and the tread side groove wall 20A has a curvature, the boundary between the step portion 22 and the tire center side groove wall 20B is set to be the depth position of the step portion.

Figure 1D:
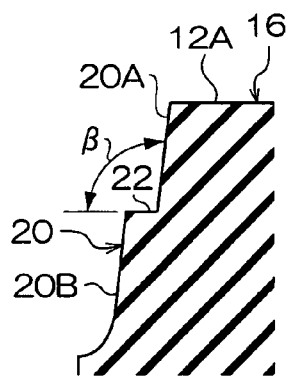
FIG. 1D is an enlarged view of the step portion in FIG. 1B.

As shown in FIG. 1D, an angle β formed between the step portion 22 and the tread side groove wall 20A which is continuous with the step portion 22 is in a range of from 70° to 120°.

The reason why the angle β is set in this range is that if the angle is less than 70°, the durability with respect to the land portion wrench is deteriorated, and if the angle exceeds 120°, the deformation absorbing effect of the land portion 16 by the step portion 22 is reduced.

In order to enhance the rigidity of a skirt of the land portion 16, the step portion 22 is formed by projecting the tire center side groove wall 20B from, as a reference, the tread side groove wall 20A (by widening the skirt), and the tread side groove wall 20A and the tire center side groove wall 20B are substantially in parallel to each other.

Therefore, the above numeric value range of the angle β shows a range of inclination angle of the step portion 22 when the tread side groove wall 20A and the tire center side groove wall 20B are substantially in parallel to each other.

(Effect)

Figure 2:
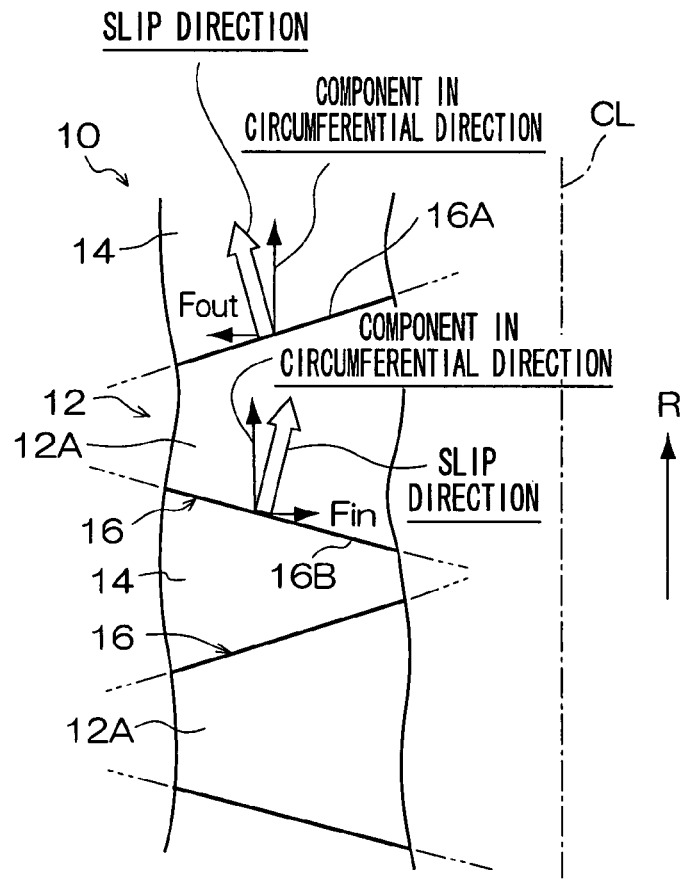
FIG. 2 is an explanatory diagram showing directions of slips acting on a tread.
Figure 3:
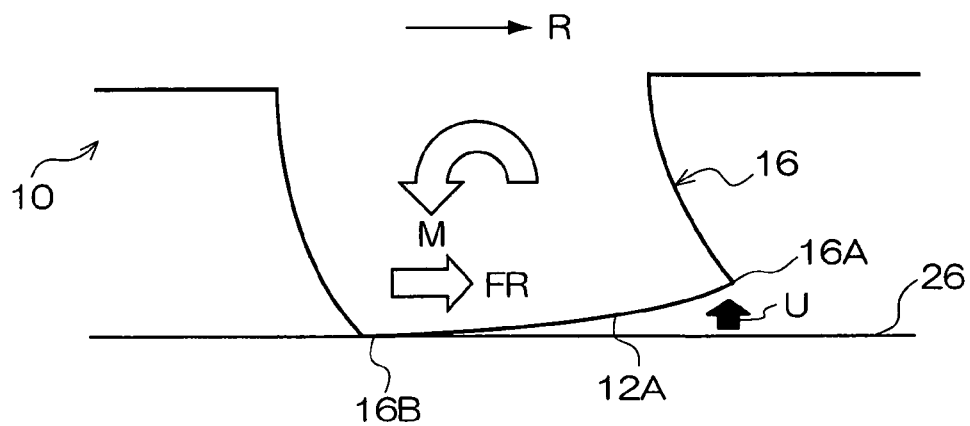
FIG. 3 is an explanatory diagram showing a phenomenon that when a groove wall does not have a step portion, a land portion is deformed by a moment applied to the land portion, and a tread-in end lifts.

In FIGS. 2 and 3, if the pneumatic tire 10 rolls on a road surface 26 in the direction of arrow R, a slip is generated on the edge of the land portion 16 in the region 40 in a direction orthogonal to the groove wall 20.

Since the average groove width WA of the lug groove 14 at the side of the tread side 12A in this embodiment is widened toward the axial outer side of the tire in the region 40, the direction of the slip at the tread-in end 16A is in the outer direction of the tire, and the slip at the kicking end 16B is in the inner direction of the tire.

If this slip direction is divided into a component in the axial direction of the tire and a component in the circumferential direction of the tire, the tread-in end 16A has a component Fout in the outer direction of the tire, and the kicking end 16B has a component Fin in the inner direction of the tire.

There is a tendency that the kicking end 16B has a greater slip in the outer direction of the tire which may cause the abrasion because a ground-contact pressure concentrates, as compared with the tread-in end 16A. However, the component Fin in the inner direction of the tire is added in the kicking end 16B and the component Fout in the outer direction of the tire is added in the tread-in end 16A, and thus, the abrasion of the tread-in end 16A is accelerated, and the abrasion of the kicking end 16B is suppressed.

With this, the biased abrasion, i.e., the heal-and-toe abrasion in the circumferential direction of the tire in which the abrasion amount of the kicking end 16B becomes especially greater than that of the tread-in end 16A is improved.

Since the abrasion amount of the kicking end 16B of the land portion 16 is suppressed, the concentration of the ground-contact pressure around the kicking end 16B is improved and as a result, the abrasion amount in the region 50 from ¼ point toward the axial outer side of the tire is also reduced, and the biased abrasion in the widthwise direction of the tire is improved.

However, when the average groove width WA of the tread side is widened toward the axial outer side of the tire, the ground-contact length in the circumferential direction of the tire at the land portion 16 near the ground-contact end 18 becomes short, and the rigidity of the land portion is reduced. As shown in FIG. 3, when the groove wall 20 is not provided with the step portion 22, the land portion 16 is deformed by a moment M caused by the force FR from the road surface 26, the tread-in end 16A lifts from the road surface 26 in the direction of arrow U, and the tread-in end 16A can not bear the ground-contact pressure.

Figure 4:
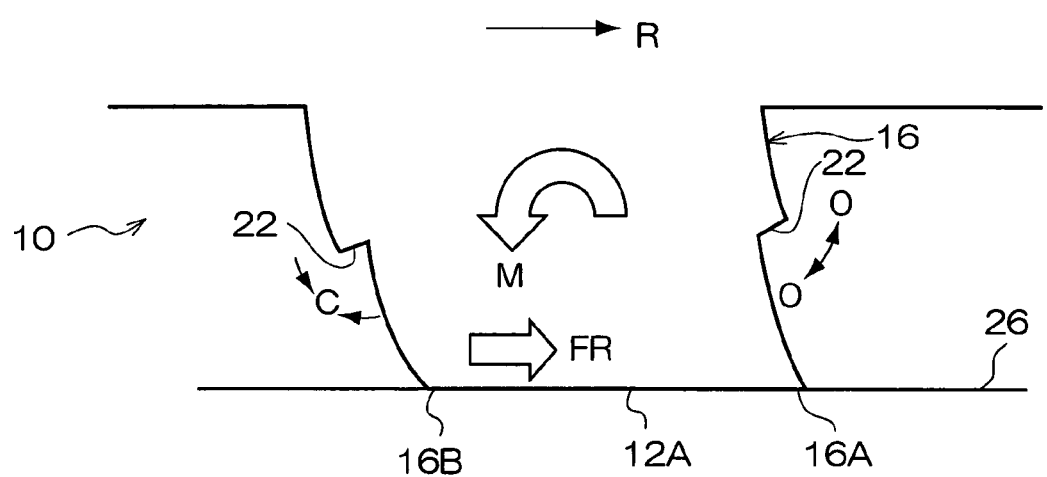
FIG. 4 is an explanatory diagram showing that if a step portion is provided, rigidity of the land portion is increased, deformation of the land portion is absorbed by the step portion, and the lift of the tread-in end is suppressed.

In this embodiment, as shown in FIG. 4, the average groove width WA of the step portion 22 at the side of the tread side 12A is widened toward the axial outer side of the tire, the width WS of the step portion 22 is increased toward the axial outer side of the tire, and since the groove wall 20 of the lug groove 14 is provided with the step portion 22, in the portion of the land portion 16 close to the ground-contact end 18 where the ground-contact length is short, the rigidity of the skirt of the land portion 16 is enhanced and deformation of the land portion 16 can be suppressed. At the same time, the deformation of the land portion 16 can be absorbed by the step portion 22, the lift of the land portion 16 from the road surface 26 at the tread-in end 16A can be suppressed, and the tread-in end 16A can bear the ground-contact pressure and the abrasion of the kicking end 18 can be reduced.

More concretely, the deformation at the tread-in side is generated in a direction (direction of the arrow O) in which the angle β of the step portion 22 is increased, the deformation at the kicking-side is generated in a direction (direction of arrow C) in which the angle β of the step portion 22 is reduced, thereby absorbing the deformation of the land portion 16 caused by the moment M.

In the pneumatic tire 10, a distance from the tread side 12A to the step portion 22 is appropriately set and the angle β formed between the step portion 22 and the tread side groove wall 20A is also appropriately set. Therefore, the effect of the step portion 22 can be exhibited most effectively.

The volume of the lug groove 14 is sufficiently secured (volume of the tread rubber is not excessive) even in a portion of the land portion 16 where the ground-contact length close to the tire equatorial plane CL is long, and radiation ability and drainage ability are maintained.

Second Embodiment

A pneumatic tire 30 of the present embodiment, in the pneumatic tire 10 of the first embodiment, a circumferential groove 32 extending in the circumferential direction of the tire is formed in the tread 12 in a region where a distance from the tire equatorial plane CL toward the axial outer side of the tire is in a range of from 0.55L to 0.70L.

The reason why the position where the circumferential groove 32 is formed is set in this manner is that if the distance is less than 0.55L, the rigidity near the circumferential groove 32 is lowered and the biased abrasion resistance is deteriorated, and if the distance exceeds 0.70L, the effect of the circumferential groove 32 is not easily transmitted to the ¼ point, the influence of the lug groove angle near the ground-contact end 18 exerted on the biased abrasion suppressing effect can not be eliminated.

In consideration of cracks at the groove bottom or the like, it is preferable that the groove width of the circumferential groove 32 is in a range of from 0.01L to 0.1L with respect to a distance L from the tire equatorial plane CL to the ground-contact end 18, and a groove depth of the circumferential groove 32 is in a range of from 20 to 60% of a groove depth of the lug groove 14.

Since other portions are the same as those of the first embodiment, the same portions are designated with the same reference numerals and explanation thereof will be omitted.

(Effect)

When there is no circumferential groove 32, the influence of deformation of the tread 12 near the ground-contact end 18 is exerted to the ¼ point and the biased abrasion suppressing effect is deteriorated depending upon the set angle of the lug groove near the ground-contact end 18. However, according to the pneumatic tire 30, since the tread 12 is formed with the circumferential groove 32, the deformation of the tread 12 near the ground-contact end 18 is shut down by the circumferential groove 32, and the deformation is not influenced to the ¼ point.

Therefore, it is possible to enhance the biased abrasion resistance without depending upon the set angle of the lug groove 14 near the ground-contact end 18.

If the groove width and the groove depth of the circumferential groove 32 are appropriately set as described above, it is possible to suppress a crack, or the like, generated from the groove bottom of the circumferential groove 32.

(Example of Test)

First, attention is paid to the inclination angle of the lug groove and the circumferential groove, pneumatic tires of the conventional examples (FIGS. 6A and 6B), embodiments 1 to 3, and comparative examples 1 to 4 are respectively mounted to construction dump trucks, and the abrasion test is carried out by allowing the trucks to run, and the results are compared with each other.

Besides shown in Table 1, the test conditions further include that the tire size is 40.00 R 57, internal pressure is 700 kPa, tires are mounted on front wheels which are steering wheels, running speed is 20 km/h, running distance is 30000 km, and the road surface is unpaved.

Figure 6:
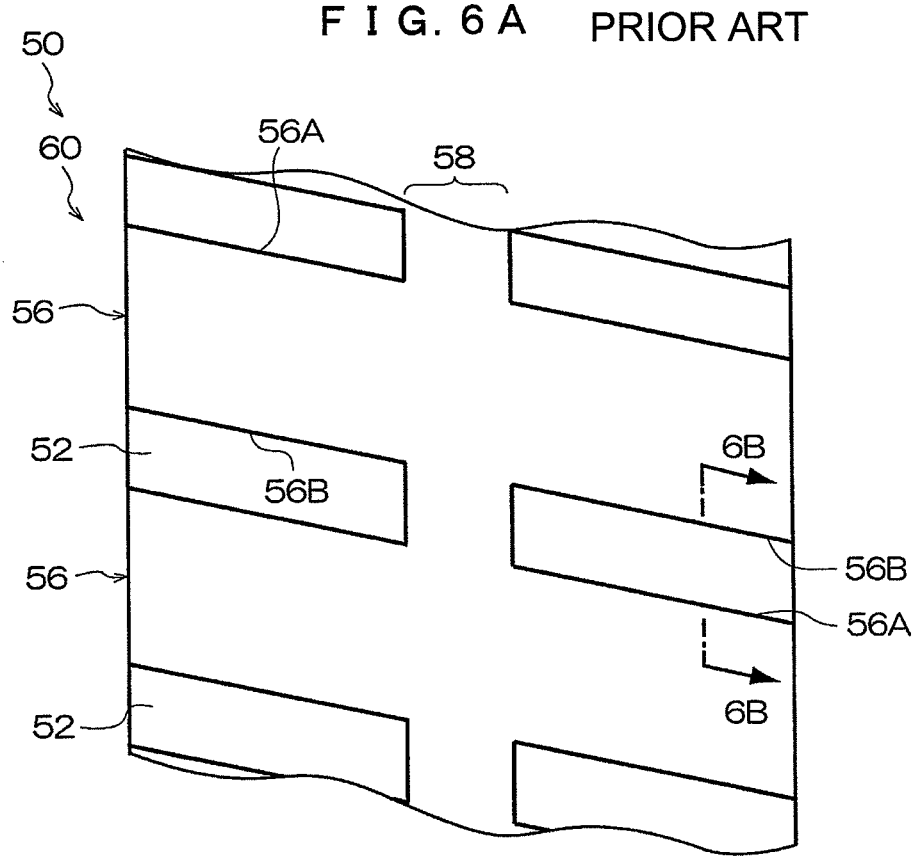
FIG. 6A is a diagram showing a tread pattern of a conventional pneumatic tire.
FIG. 6B is a cross-sectional view taken along the line 6B-6B in FIG. 6A.
Figure 6:
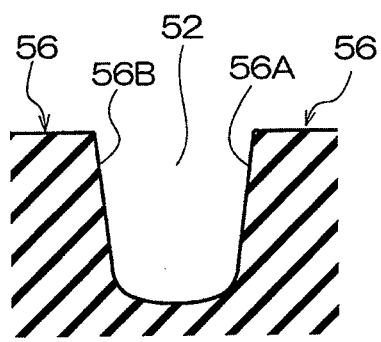

In FIGS. 6A and 6B, in a pneumatic tire 50 relating to the conventional examples, groove walls 54 of a lug groove 52 are inclined at a tread-in end 56A and a kicking end 56B of a land portion 56 in the same direction with respect to the axial direction of the tire. In FIG. 6A, the reference numeral 58 represents a center rib, and the reference numeral 60 represents a tread.

The pneumatic tire of the embodiment 1 includes the tread 12 shown in FIGS. 1A and 1B, the inclination angle α of the tread side groove wall 20A is in a range of from 70° to 85°, and the groove depth of the lug groove 14 is 90 mm. The width WS of the step portion 22 at the ground-contact end 18 is 15 mm, and its width is reduced toward the tire equatorial plane CL. A groove width of the lug groove 14 near the tread side 12A of the ground-contact end 18 is 80 mm.

The pneumatic tire of the embodiment 2 is different from the pneumatic tire of the embodiment 1 in that corners between the step portion 22 and the tread side groove wall 20A have a curvature as shown in FIG. 1C, and other structures are the same as those of the embodiment 1.

Figure 5:
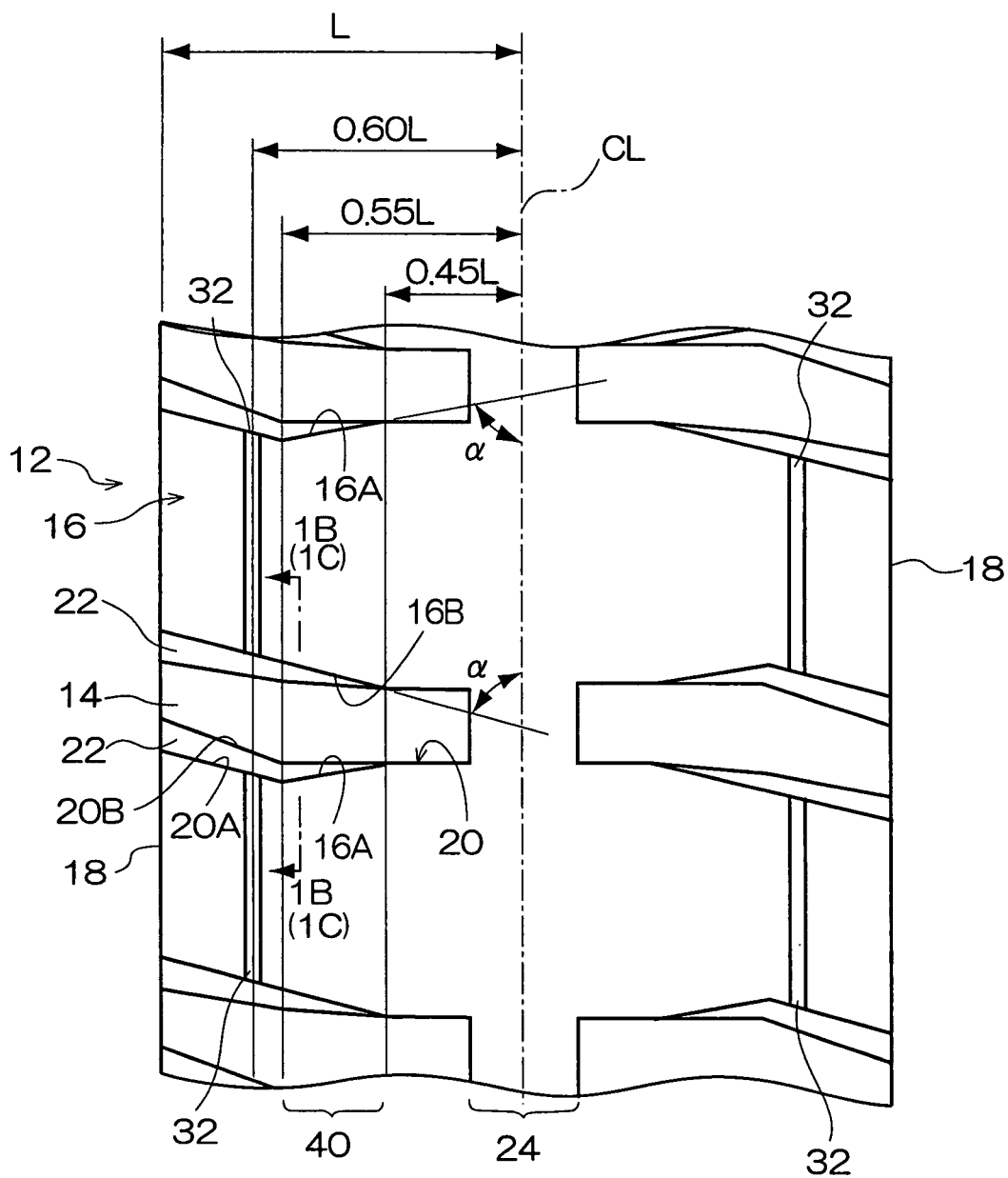
FIG. 5 is a diagram showing a tread pattern of a pneumatic tire according to a second embodiment.

The pneumatic tire of the embodiment 3 is different from the pneumatic tire of the embodiment 1 in that the circumferential groove 32 is formed as shown in FIG. 5, and other structures are the same as those of the embodiment 1.

The comparative example 1 has excessively small inclination angle α, the comparative example 2 has excessively large inclination angle α, the comparative example 3 has the circumferential groove 32 located on excessively inner side (close to the tire equatorial plane CL), and the comparative example 4 has the circumferential groove 32 located on excessively outer side (closet to the ground-contact end 18).

The running test is carried out under such conditions, differences in the abrasion amount between the tread-in end 16A and the kicking end 16B of the land portion 16 at the ¼ point and the abrasion amount of the rubber are obtained. A result thereof is shown in Table 1.

As the difference in abrasion amount between the tread-in end 16A and the kicking end 16B is smaller, the biased abrasion resistance is more excellent.

Concerning the abrasion amount of rubber, the abrasion amount is converted into rubber weight, and this is indicated using index in which a value of the conventional example is 100. As the numeric value is smaller, the abrasion amount is less.

According to Table 1, it can be found that a difference in abrasion amount between the tread-in end 16A and the kicking end 16B in the embodiments 1 to 3 is smaller than that of the conventional example, and the biased abrasion resistance is enhanced.

From the results of the comparative examples 1 and 2, it can be found that if the inclination angle α of the tread side groove wall 20A of the lug groove is excessively large or small, and enhancement of the biased abrasion resistance is lowered (if the groove walls 20 at the tread-in end 16A and the kicking end 16B of the land portion 16 are inclined in opposite directions with respect to the axial direction of the tire, the biased abrasion resistance is enhanced but its effect is deteriorated).

From the results of the comparative examples 3 and 4, it can be found that if the circumferential groove 32 is located at the excessively inner or outer side, the enhancement of the biased abrasion resistance is deteriorated.

Next, an abrasion test is carried out while paying attention to the cross-sectional shape of the lug groove under conditions shown in Table 2. A result of the test will be explained.

The comparative example 5 has the step portion 22 located on the groove bottom side of the lug groove 14, and the comparative example 6 has the step portion 22 located on the side of the tread side 12A. In the comparative example 7, the angle β formed between the tread side groove wall 20A and the step portion 22 is acute angle, and in the comparative example 8, the angle β is obtuse angle.

The running test is carried out under such conditions, differences in the abrasion amount between the tread-in end 16A and the kicking end 16B of the land portion 16 at the ¼ point and the abrasion amount of the rubber are obtained. A result thereof is shown in Table 2.

As the difference in abrasion amount between the tread-in end 16A and the kicking end 16B is smaller, the biased abrasion resistance is more excellent.

Concerning the abrasion amount of the rubber, the abrasion amount is converted into rubber weight, and this is indicated using index in which a value of the conventional example is 100 as in the above test example. As the numeric value is smaller, the abrasion amount is less.

In Table 2, a length of a crack generated in the step portion 22 is also indicated as an index of wrench performance of the land portion.

From the results of the comparative examples 5 and 6, it can be found that if the step portion is too close to the groove bottom of the lug groove or too close to the tread side, the effect of enhancing the biased abrasion resistance is deteriorated.

From the results of the comparative examples 7 and 8, it can be found that if the angle β formed between the tread side groove wall 20A and the step portion 22 is excessively obtuse, the effect of enhancing the biased abrasion resistance is deteriorated and if the angle β is excessively acute, the wrench durability of the land portion is deteriorated.

TABLE 1

|  | Inclination direction of groove walls at tread-in end and kicking end | Angle (°) formed between tire equatorial plane and groove wall of lug groove | Ratio of distance from tire equatorial plane to groove center in circumferential direction to distance from tire equatorial plane to ground-contact end | Difference (mm) in abrasion amount between tread-in end and kicking end at ¼ point | Abrasion amount (index) |
|---|---|---|---|---|---|
| Conventional example | Same | 80 | — | 8 | 100 |
| Embodiment 1 | Opposite | 80 | — | 5 | 85 |
| Embodiment 2 | Opposite | 80 | — | 3.5 | 87 |
| Embodiment 3 | Opposite | 80 | 0.60 | 3.2 | 82 |
| Comparative example 1 | Opposite | 60 | 0.60 | 7.5 | 93 |
| Comparative example 2 | Opposite | 88 | 0.60 | 6.5 | 95 |
| Comparative example 3 | Opposite | 80 | 0.52 | 6.8 | 96 |
| Comparative example 4 | Opposite | 80 | 0.75 | 7.2 | 92 |

TABLE 2

|  | Depth position of step portion | Angle (°) formed between step portion and tread-in side groove wall | Curvature (mm) of step portion | Length (mm) of crack in step portion | Difference (mm) in abrasion amount between tread-in end and kicking end at ¼ point | Abrasion amount (index) |
|---|---|---|---|---|---|---|
| Conventional example | — | — | — | 0 | 8 | 100 |
| Embodiment 1 | 50 | 80 | — | 0.5 | 5 | 85 |
| Embodiment 2 | 50 | 80 | 5 | 0.2 | 3.5 | 87 |

TABLE 2-continued

| | Depth position of step portion | Angle (°) formed between step portion and tread-in side groove wall | Curvature (mm) of step portion | Length (mm) of crack in step portion | Difference (mm) in abrasion amount between tread-in end and kicking end at ¼ point | Abrasion amount (index) |
|---|---|---|---|---|---|---|
| Embodiment 3 | 50 | 80 | — | 0.3 | 3.2 | 82 |
| Comparative example 5 | 80 | 80 | — | 0.5 | 7.8 | 95 |
| Comparative example 6 | 20 | 80 | — | 0.5 | 7.7 | 96 |
| Comparative example 7 | 50 | 130 | — | 0.3 | 7.9 | 96 |
| Comparative example 8 | 50 | 60 | — | 1.2 | 5.3 | 88 |

INDUSTRIAL APPLICABILITY

In a pneumatic tire for heavy load, it is possible to enhance biased abrasion resistance of a tread.

EXPLANATION OF REFERENCE NUMERALS 10 pneumatic tire
12 tread
12A tread side
14 lug groove
16 land portion
16A tread-in end
16B kicking end
18 ground-contact end
20 groove wall
20A tread side groove wall
22 step portion
30 pneumatic tire
32 circumferential groove
40 region
WA average groove width at tread side
WB average groove width at tire center side
WS width of step portion

| Explanation of Reference Numerals | |
|---|---|
| 10 | pneumatic tire |
| 12 | tread |
| 12A | tread side |
| 14 | lug groove |
| 16 | land portion |
| 16A | tread-in end |
| 16B | kicking end |
| 18 | ground-contact end |
| 20 | groove wall |
| 20A | tread side groove wall |
| 22 | step portion |
| 30 | pneumatic tire |
| 32 | circumferential groove |
| 40 | region |
| WA | average groove width at tread side |
| WB | average groove width at tire center side |
| WS | width of step portion |

The invention claimed is:

1. A pneumatic tire having lug grooves arranged in a tread in a direction intersecting a circumferential direction of the tire and arranged in the circumferential direction of the tire, and land portions divided by the lug grooves, wherein
when a distance from a ground-contact end to a tire equatorial plane is defined as L in a state in which the tire is assembled to a normal rim and a normal internal pressure is charged into the tire and a normal load is applied to the tire,
in a region where a distance from the tire equatorial plane to an axial outer side of the tire is in a range of from 0.45L to 0.55L,
a step portion which is a boundary between a tread side groove wall and a tire center side groove wall is respectively provided on both sides of the lug groove,
an average groove width at the tread side of the step portions is widened toward the axial outer side of the tire and a width of the step portion is increased toward the axial outer side of the tire, and
the tread side groove walls at a tread-in end and a kicking end of the land portion are inclined in opposite directions to each other with respect to an axial direction of the tire,
wherein a depth position where the step portion is formed is a position of from 0.3 to 0.7 times of a groove depth of the lug groove from the tread side to the tire center side, and
wherein in a region where the distance from the tire equatorial plane is in a range of from 0.55L to the axial outer side of the tire:
an average width of the lug groove is substantially constant, and
an average width between the tire center side groove walls is decreased toward the axial outer side of the tire.

2. A pneumatic tire having lug grooves arranged in a tread in a direction intersecting a circumferential direction of the tire and arranged in the circumferential direction of the tire, and land portions divided by the lug grooves, wherein
when a distance from a ground-contact end to a tire equatorial plane is defined as L in a state in which the tire is assembled to a normal rim and a normal internal pressure is charged into the tire and a normal load is applied to the tire,
in a region where a distance from the tire equatorial plane to an axial outer side of the tire is in a range of from 0.45L to 0.55L,
a step portion which is a boundary between a tread side groove wall and a tire center side groove wall is respectively provided on both sides of the lug groove,
an average groove width at the tread side of the step portions is widened toward the axial outer side of the tire and a width of the step portion is increased toward the axial outer side of the tire, and the tread side groove walls at a tread-in end and a kicking end of the land portion are inclined in opposite directions to each other with respect to an axial direction of the tire, wherein a depth position where the step portion is formed is a position of from 0.3 to 0.7 times of a groove depth of the lug groove from the tread side to the tire center side, and wherein a groove width between the tread side groove walls and a groove width between the tire side groove walls continuously increase from a groove bottom to a tread side of the tire; and wherein in a region where the distance from the tire equatorial plane is in a range of from 0.55L to the axial outer side of the tire:

an average width of the lug groove is substantially constant, and an average width between the tire center side groove walls is decreased toward the axial outer side of the tire.

3. The pneumatic tire of claim 2, wherein a circumferential groove extending in the circumferential direction of the tire is formed at a region of the tread where a distance from the tire equatorial plane to the axial outer side of the tire is in a range of from 0.55L to 0.70L.

4. The pneumatic tire of claim 2, wherein an angle formed between the step portion and the tread side groove wall connected to the step portion is in a range of from 70° to 120°.

5. The pneumatic tire of claim 2, wherein the step portion begins a distance of 0.45L from the tire equatorial plane and continued to the axial outer side of the tire.

* * * * *